US012583589B2

(12) United States Patent
Kaliszczyk et al.

(10) Patent No.: US 12,583,589 B2
(45) Date of Patent: Mar. 24, 2026

(54) LOCKABLE MOUNTING FITTING

(71) Applicant: B/E Aerospace, Inc., Winston-Salem, NC (US)

(72) Inventors: Piotr Krzysztof Kaliszczyk, Wrocław (PL); Marcin Szymon Kołodziejczak, Wrocław (PL)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 19/049,823

(22) Filed: Feb. 10, 2025

(65) Prior Publication Data

US 2025/0256851 A1      Aug. 14, 2025

(30) Foreign Application Priority Data

Feb. 9, 2024      (EP) ..................................... 24461527

(51) Int. Cl.
B64D 11/06          (2006.01)
(52) U.S. Cl.
CPC ................................ B64D 11/0696 (2013.01)
(58) Field of Classification Search
CPC ............ B64D 11/0696; B61D 33/0078; B60N 2/01508; B60N 2/01533
See application file for complete search history.

(56) References Cited

U.S. PATENT DOCUMENTS 5,810,443 A * 9/1998 Blanchard .............. B60N 2/305
                                                            297/378.12
5,871,318 A    2/1999 Dixon et al.

9,663,232 B1    5/2017 Porter et al.
10,829,225 B2   11/2020 Doughty et al.
11,180,258 B2   11/2021 Chadwell
11,584,259 B2   2/2023 Cantos et al.
2009/0003929 A1* 1/2009 Rudduck ................. F16B 7/025
                                                            403/348
2019/0092480 A1* 3/2019 Gross ...................... F16B 2/185

FOREIGN PATENT DOCUMENTS

GB          1280061 A      7/1972
WO      2010047900 A2      4/2010
WO      2021183314 A1      9/2021

OTHER PUBLICATIONS

European Patent Office, Extended European Search Report received in EP Application No. 24461527.4, Jun. 24, 2024, 7 pages.

* cited by examiner

*Primary Examiner* — Magdalena Topolski
*Assistant Examiner* — Shanna Danielle Glover
(74) *Attorney, Agent, or Firm* — Suiter Swantz IP

(57)          ABSTRACT

A mounting fitting includes an elongate fitting body having a first portion configured to be attached to the object and a second portion having a locking mechanism configured to releasably lock the mounting fitting. The locking mechanism includes a housing including a push-button on a spring, where the spring is biasing the push-button relative to the housing to extend from an opening in the housing, in an unlocked position, and where the button has one or more legs extending into the housing. The legs may be configured to extend from the housing, in a locking position, when the push-button is pressed against the force of the spring for engagement, in use, with the surface. The elongate fitting body further includes a quick-release mechanism between the push-button and the housing configured to lock the button in the locking position and to release the button from the locking position.

12 Claims, 15 Drawing Sheets

171U

LOCKABLE MOUNTING FITTING

CROSS-REFERENCE TO RELATED APPLICATIONS

The present disclosure claims the benefit of European Patent Application No. EP 24461527.4, filed Feb. 9, 2024, which is herein incorporated by reference in the entirety.

TECHNICAL FIELD

The present disclosure concerns fittings for mounting items to a floor or other platform, such as, but not exclusively, for mounting a seat in a vehicle or aircraft.

BACKGROUND

There is, in many applications, a need to removably mount and secure an item to a platform or floor. In some situations, it may be desired to mount the object at different positions according to circumstances. One example is seating used in vehicles or aircraft, including helicopters. Seats are typically mounted to the floor or platform of the vehicle/aircraft using a fitting attached to a lower part of the seat which slides into and is secured in tracks provided on the floor/platform. The fittings and tracks may be configured to allow sliding movement of the seat along the track to an appropriate position, where the fitting may be releasably locked relative to the track to secure the seat at the required position along the track. Such tracks are usually arranged to align with/extend longitudinally to or be orthogonal to/extend laterally to the direction of motion—i.e., the driving or flight direction. Typically, the fitting is locked in position relative to the track by means of fasteners such as screws or bolts or other fasteners. In some applications, it may be necessary to change the position or configuration of the seats, e.g., in a helicopter during a rescue operation. Such locking systems require a number of additional fastener parts (e.g., the screws etc.) and also require time and labour and tools to fasten and then unfasten, if the seats need to be adjusted or reconfigured, the fitting. There is a desire for an improved mounting system that simplifies mounting and releasably locking in position, an object to a platform (which, hereinafter, includes a floor).

SUMMARY

Accordingly, there is provided a mounting fitting for mounting an object to a surface and releasably locking the object in one or more positions relative to the surface. The mounting fitting includes an elongate fitting body including a first portion configured to be attached to the object, in use, and a second portion having a locking mechanism configured to releasably lock the mounting fitting relative to the surface, in use, where the locking mechanism includes a housing within which is mounted a push-button on a spring, the spring biasing the push-button relative to the housing to extend from an opening in the housing, in an unlocked position, the push-button having one or more legs extending into the housing, the legs configured to extend from the housing, in a locking position, when the push-button is pressed against the force of the spring for engagement, in use, with the surface so as to prevent movement of the mounting fitting relative to the surface, the fitting including a quick-release mechanism between the push-button and the housing configured to lock the button in the locking position and to release the push-button from the locking position by further application of force to the push-button when it is in the locking position.

The quick-release mechanism may include a ball arranged to travel around a groove in the push-button and a complementary groove in the housing.

The groove in the button may have an upper extreme and a lower extreme, where the ball is located between the upper extreme of the groove in the push-button and the complementary groove in the housing when in the unlocked position and between the lower extreme of the groove in the push-button and the complementary groove in the housing when in the locked position.

The ball may be caused to move from the lower extreme to the upper extreme in response to the further application of force to the push-button when in the locking position.

The groove may have a non-symmetrical inner profile.

In embodiments, the first portion includes a means for attachment to the object, in use. The means for attachment may include a hole through the first portion.

The second portion may also include a means for attachment, e.g., a lower edge of the elongate fitting body, to the surface, in use.

The legs of the push-button may have a curved or arcuate profile.

The locking mechanism may be configured to lock in two or more distinct positions on the surface.

In embodiments, the first portion is configured to be attached to a vehicle seat and the locking mechanism is configured to releasably lock to a track on a floor or platform. The legs may be configured to be fitted into a curved recess of the track.

The fitting may be used to mount a vehicle seat, such as an aircraft seat, to a floor or platform.

BRIEF DESCRIPTION

Examples of the mounting fitting according to this disclosure will now be described with reference to the drawings. It should be noted that these are examples only and variations are possible within the scope of the claims. In particular (but not only) the examples are described with reference to mounting a vehicle/aircraft seat to a floor or platform, but it is feasible that the mounting system of this disclosure could also be used for mounting other objects to a floor or platform or similar surface.

DETAILED DESCRIPTION

As mentioned above, there is often a need for an object to be mounted to a surface or platform in different positions. An example is an aircraft seat mounted to the floor/platform of the aircraft. It is sometimes desired to mount the seat at a particular position on a floor or platform and at other times to reconfigure/re-position the seat to a different position. To mount such seats, typically, rails or tracks are provided on the floor or platform and a fitting is provided to be attached to the seat, on one side, and to locate in the track on the other side. The seat will be mounted at a desired position on the track (selected for safety/comfort of the user and/or to allow seat configurations suitable to the circumstances) by locating the fitting in the track and then securing the fitting relative to the track at the desired position. This is typically done by means of fasteners such as screws or bolts. If the seat is then to be re-positioned, the-fitting needs to be released/unlocked by undoing the fasteners so that the seat/fitting can be re-positioned along the track and re-fastened at the new position. This locking and unlocking requires the use of separate fasteners and tools and is time and labour intensive.

The mounting system according to this disclosure provides a quick-release fitting to be used that incorporates a locking mechanism so that the fitting can be easily locked and unlocked relative to the track by means of a locking button forming part of the fitting. In this way, the mounting position of the seat along to the track can be easily varied by pressing the button of the fitting.

Figure 1:
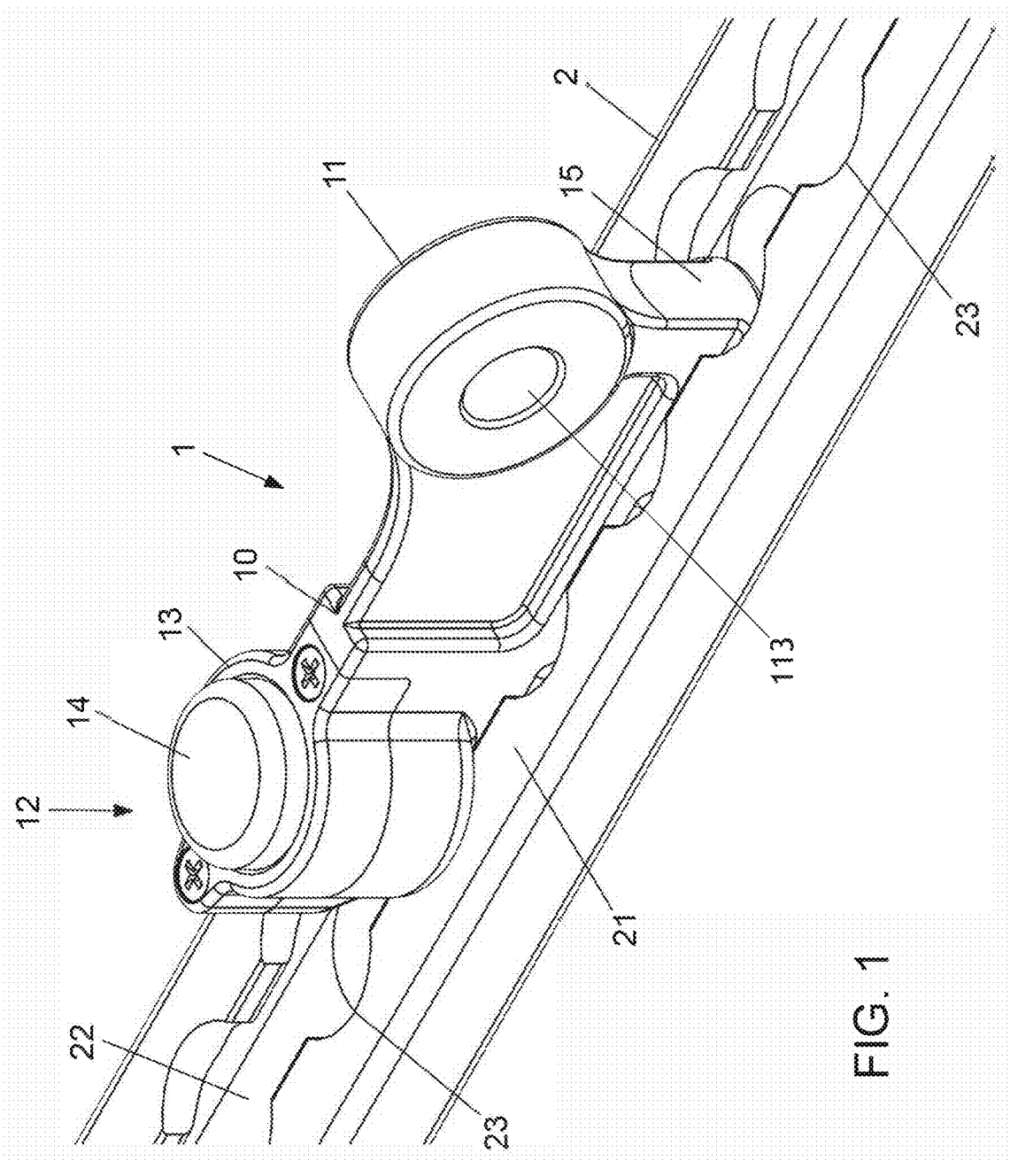
FIG. 1 shows an example of a lockable mounting fitting mounted in a track, in accordance with one or more embodiments of the present disclosure.

An example of the mounting fitting 1 of this disclosure, as mounted in a track 2, is shown in FIG. 1. The track 2 is a linear track arranged and secured in a given orientation on a floor or platform, where the track has a track body 21 and a track groove 22 running along the track body 21 and configured to receive the mounting fitting 1. The groove 22 in the track 2 may be a simple linear groove along which the mounting fitting can slide. The groove 22 may, however, be provided with discrete locking portions, where the mounting fitting can be secured to the track. For example, the track may have discrete wider portions 23 along the groove with which the locking mechanism of the fitting (as will be described further below) can engage so that the mounting fitting can be secured relative to the track.

The mounting fitting 1, shown in the figures, includes an elongate fitting body 10 including, at one end, a first portion 11 configured to be fixed to the seat or other object to be mounted and, at the other end, a second portion 12 including a quick-release locking mechanism 30 (as will be described further below) for releasably locking the fitting to the track 2, in use. The first and second portions can be formed integrally or as two separate portions attached together to form the fitting body.

In the example shown, the first portion 11 is in the form of a flange or bracket or other fitting, shaped or configured to be connected to the seat. In the example shown, the first portion is provided with a hole 113 therethrough. This can be connected to the seat e.g. by a bolt or other fastener.

Figure 4:
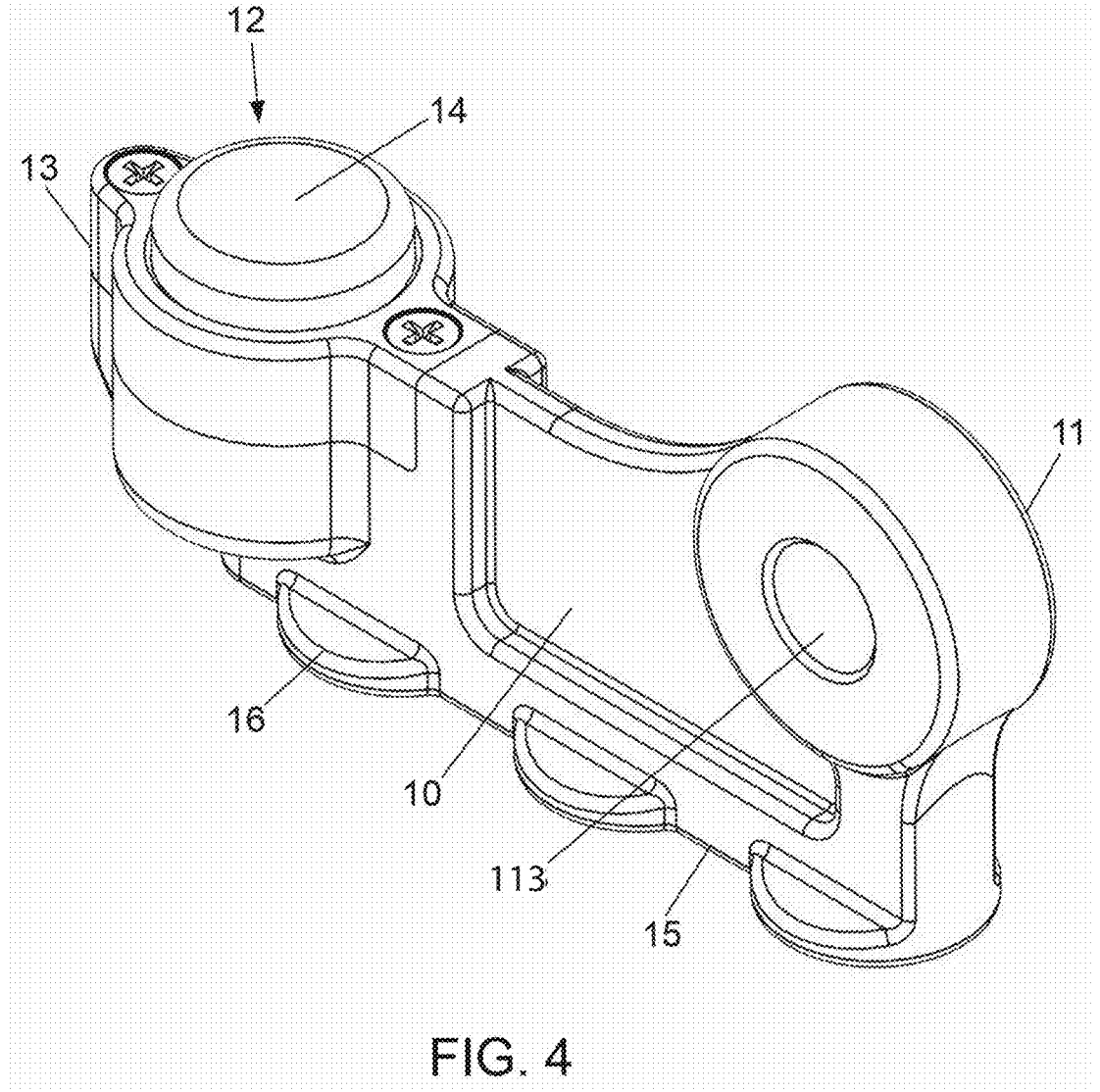
FIG. 4 is an isometric view of a fitting as shown in FIGS. 1 to 3, in accordance with one or more embodiments of the present disclosure.
Figure 5:
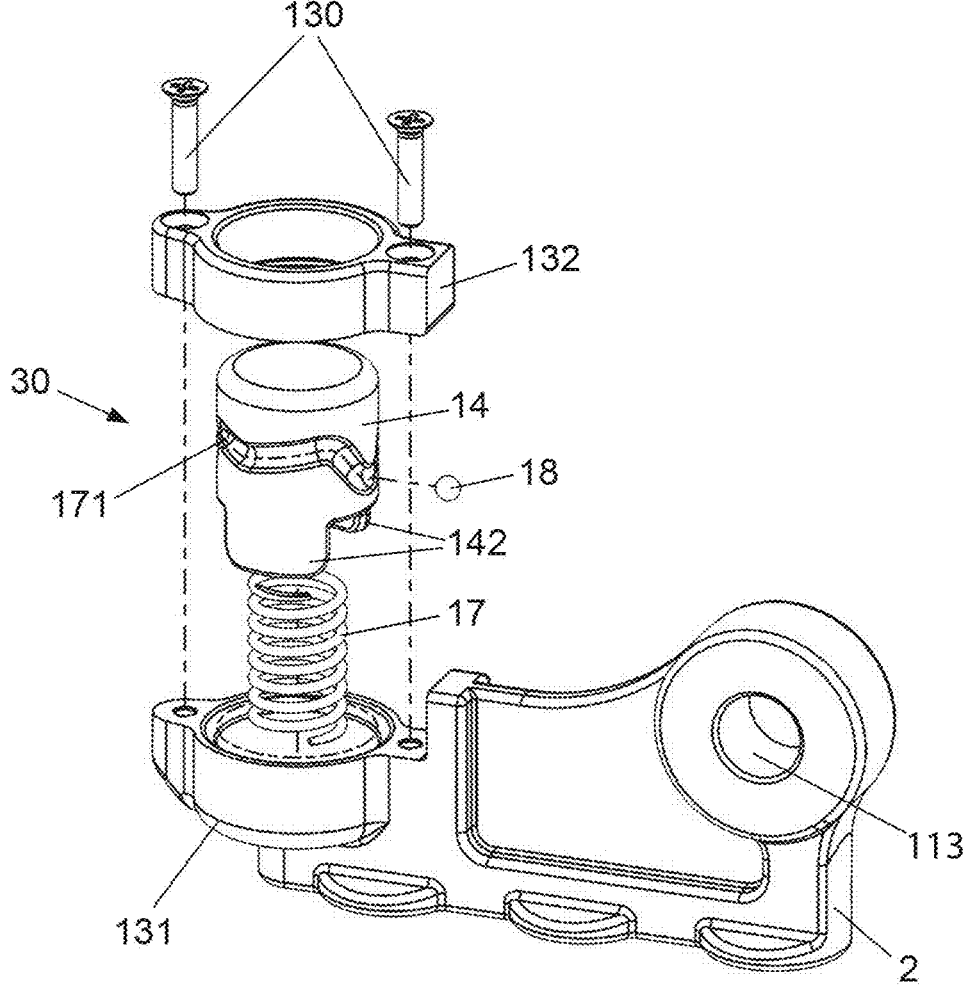
FIG. 5 is an exploded view of the fitting shown in the previous figures, in accordance with one or more embodiments of the present disclosure.

The second portion 12 forms the locking mechanism 30 and includes a housing 13 and a button 14 located within the housing 13 for push button movement within the housing. A lower part 15 of the fitting body is shaped to be slidably received within the groove 22 of the track 2, in use. In an example where the track is designed with wider groove portions, the fitting may be provided with corresponding widened portions 16, as shown in FIG. 4. The button 14 and the flange 11 extend from the opposite, upper part of the body 10.

Figure 2:
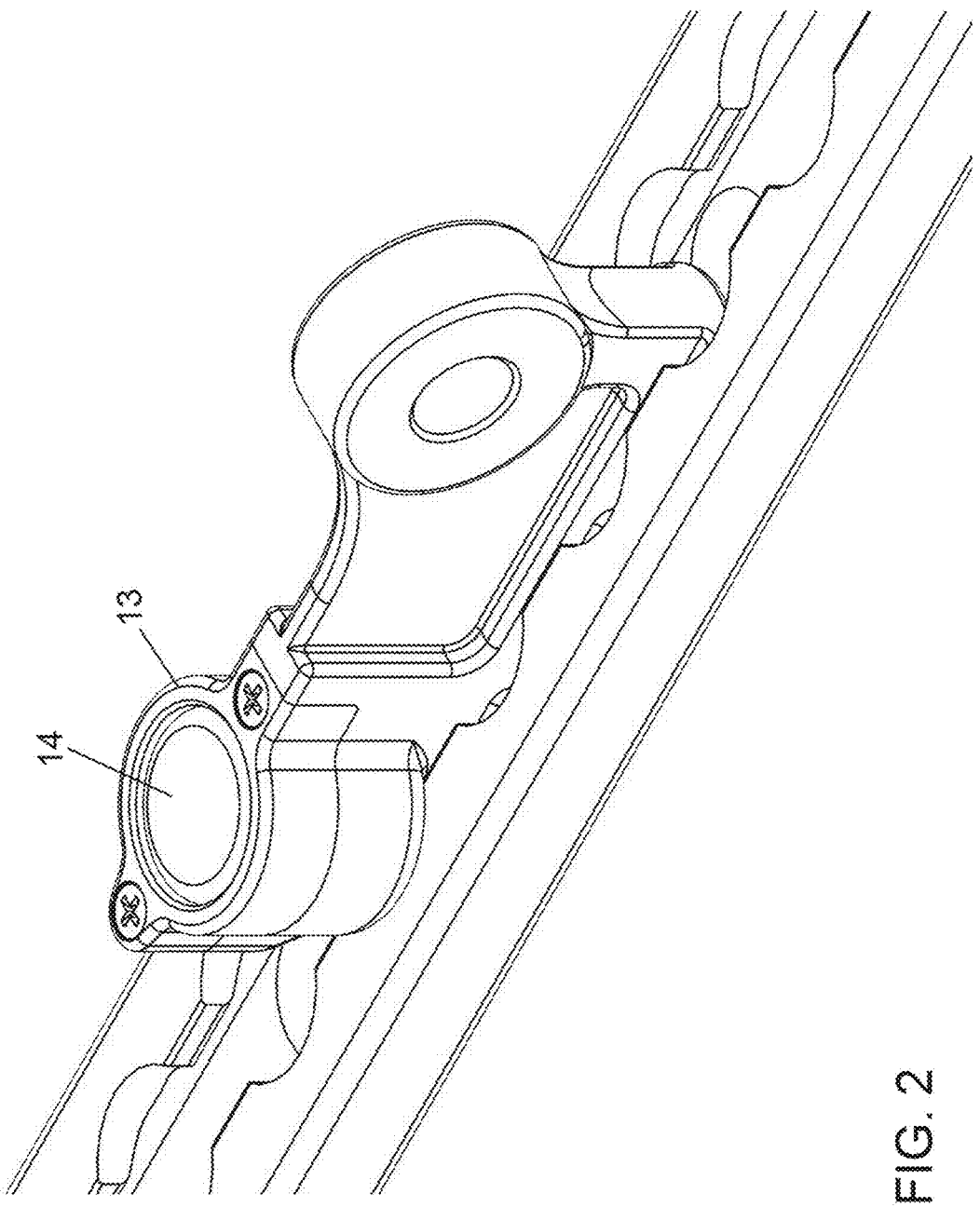
FIG. 2 shows the fitting of FIG. 1 in a first (locked) state, in accordance with one or more embodiments of the present disclosure.
Figure 3:
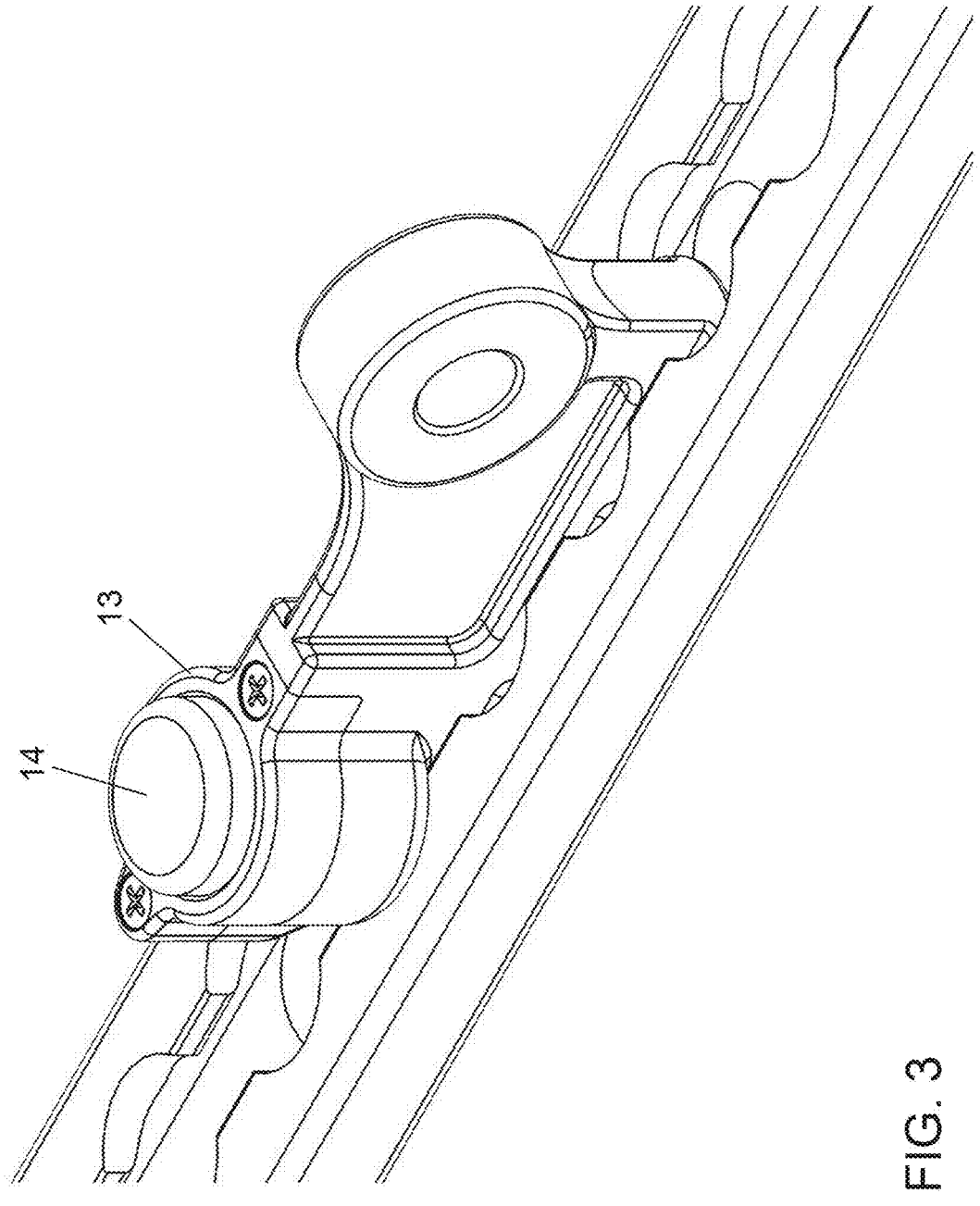
FIG. 3 shows the fitting of FIG. 1 in a second (unlocked) state, in accordance with one or more embodiments of the present disclosure.

The locking mechanism 30 is designed (as will be described further below) such that when the push-button 14 is depressed relative to the housing 13, the locking mechanism locks to the track to prevent further sliding movement of the fitting relative to the track (as shown in FIG. 2). When the button 14 is in its default position relative to the housing (i.e., extending out of the housing as shown in FIG. 3) the fitting is not locked relative to the track and is free to slide along the track. The button is configured to assume the locking position when a pushing force is applied to press the button into the housing, e.g., by the finger or thumb of a user. To release the button to the unlocked position, the button is further depressed and released.

Thus, in use, the fitting, with the seat attached to the first portion 11, and with the fitting located in the groove of the track, can be moved along the track by pushing the seat until the seat reaches its desired position along the track. At that position, the push-button 14 is pressed into the locking mechanism housing 13 to engage the locking mechanism with the track and lock the seat in position. Further depression of the button releases the locking mechanism so that the seat can be moved along the track to a different position.

The component parts of the locking mechanism will now be described further with reference to FIGS. 5 to 15.

The locking mechanism 30 includes the housing 13 and the button 14. The housing may be formed of a lower housing part 131 and an upper housing part 132 such that the button can be located in the lower housing part and then the upper housing part can be fitted over the lower housing part and secured thereto, e.g., by screws or other fittings 130. In such an example, as shown, the lower housing part 131 is formed as an integral part of the fitting body 10 and the upper housing part 132 is a separate part attached thereto once the button is located in the lower housing part. The lower housing part therefore defines a receptacle for the button. The upper housing part is in the form of a ring through which the button extends in the unlocked position and through which the button is accessible to be pressed when locked. Other forms and configurations of housing are possible provided the button can be accessed.

The button is mounted in the housing on a spring 17 that biases the button to the unlocked position relative to the housing. Pressing the button to lock the mechanism means pushing the button into the housing against the force of the spring 17.

Figure 10:
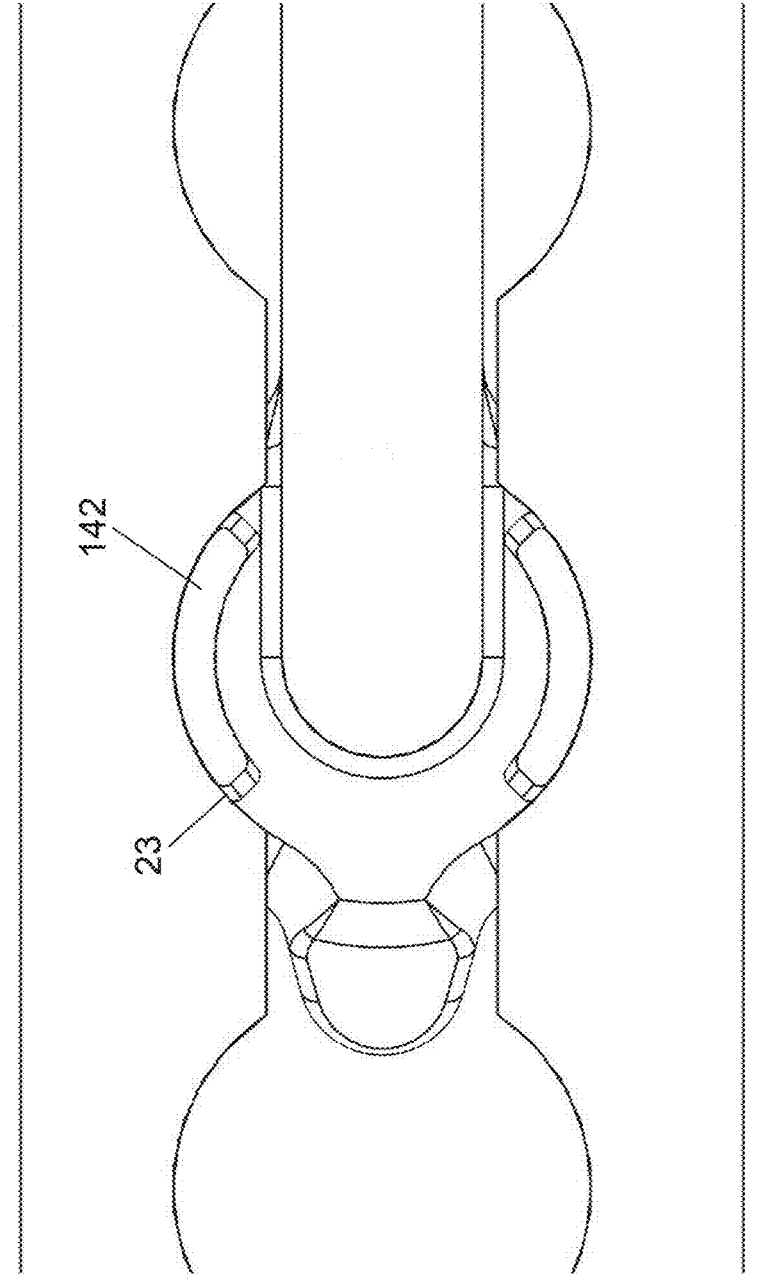
FIG. 10 is a bottom view of a fitting as previously depicted, in accordance with one or more embodiments of the present disclosure.

The button 14 has an upper surface 141 at the upper part of the housing to provide a surface to be pressed. The opposite side of the button defines two or more downwardly extending legs 142. The housing 13 is open, at the bottom, at the location of the button legs 142 and the spring 17 and the legs 142 are configured such that in the default state of the spring 17, the legs 142 are located within the housing and when the button is depressed relative to the housing, against the force of the spring, the legs extend through the housing to protrude from the bottom of the housing. Thus, when the fitting is located on a track 2, when the button is pressed, the legs extend out from the bottom of the housing into engagement with the track groove 22. In one example, the groove of the track, at discrete positions along the track, has a widened circular or arcuate form relative to the parts of the track either side of the position, such that when the button legs are located in the arcuate part of the groove, the fitting is not able to move further along the track out of the arcuate slot. This is best illustrated in FIG. 10, shown from below.

To provide the quick release mechanism, the button is provided with a quick-release feature that acts to, in the depressed locking position, prevent expansion of the spring to return to its default state and which requires further depression of the button to release the quick-release feature so that the spring is free to return to the default, unlocked state.

In the example shown, the quick-release feature is provided by a groove 171 formed around the perimeter of the button which provides a raceway for a ball 18. A complementary raceway 172 for the ball 18 is also formed in the housing 13 on the inner housing surface adjacent the button. In one example, the complementary raceway 172 may be formed where the upper and lower housing parts meet when assembled.

The groove 171 in the button 14 has two pairs of extreme positions, a lower and an upper extreme position, into which the ball 18 is pushed under the force of the spring 17. When the button is pressed, the ball 18 'jumps' to the next position. This can be seen in FIGS. 6 and 7.

Figure 6:
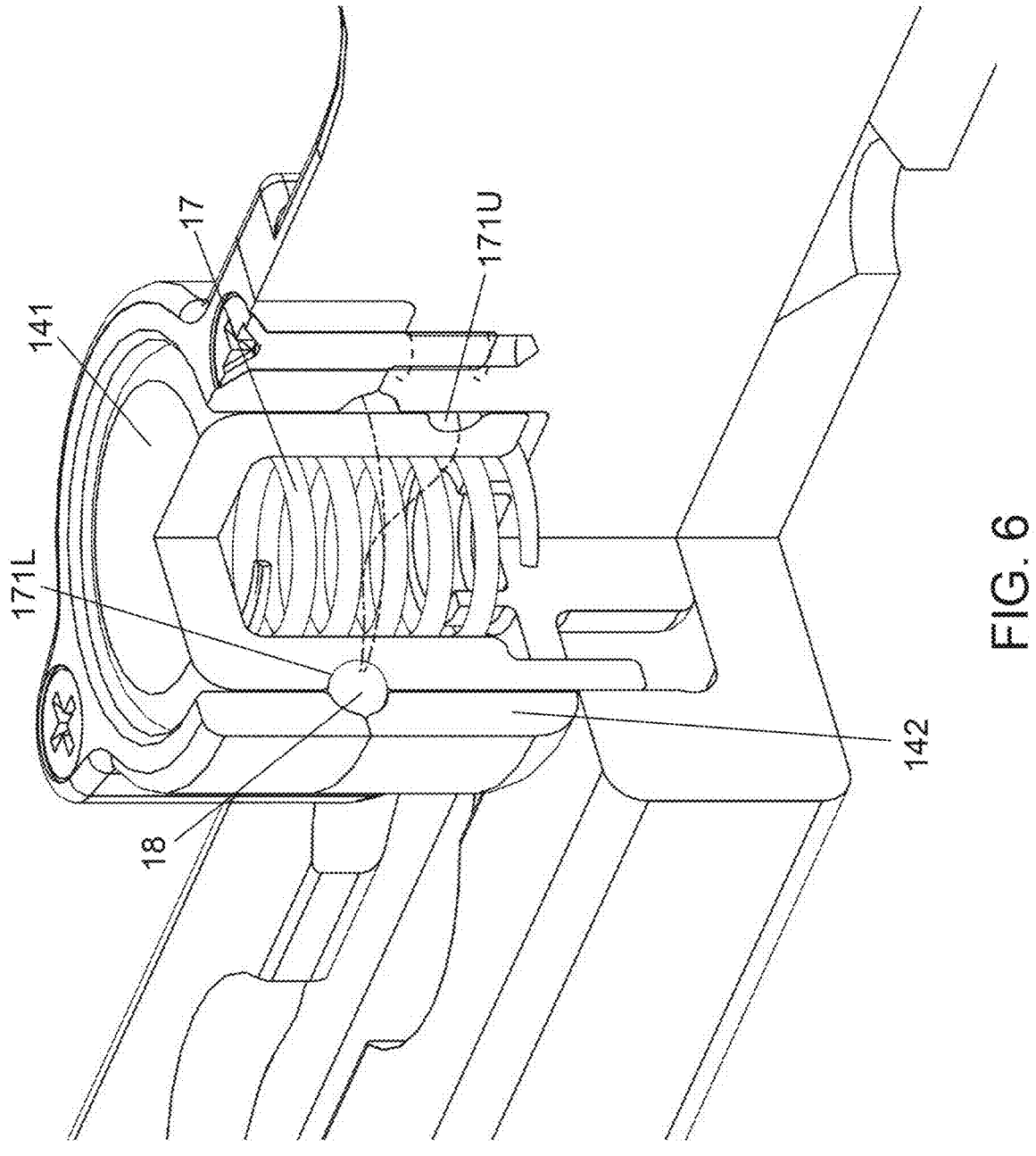
FIG. 6 is a cut-open view of a fitting in the locked state, in accordance with one or more embodiments of the present disclosure.
Figure 7:
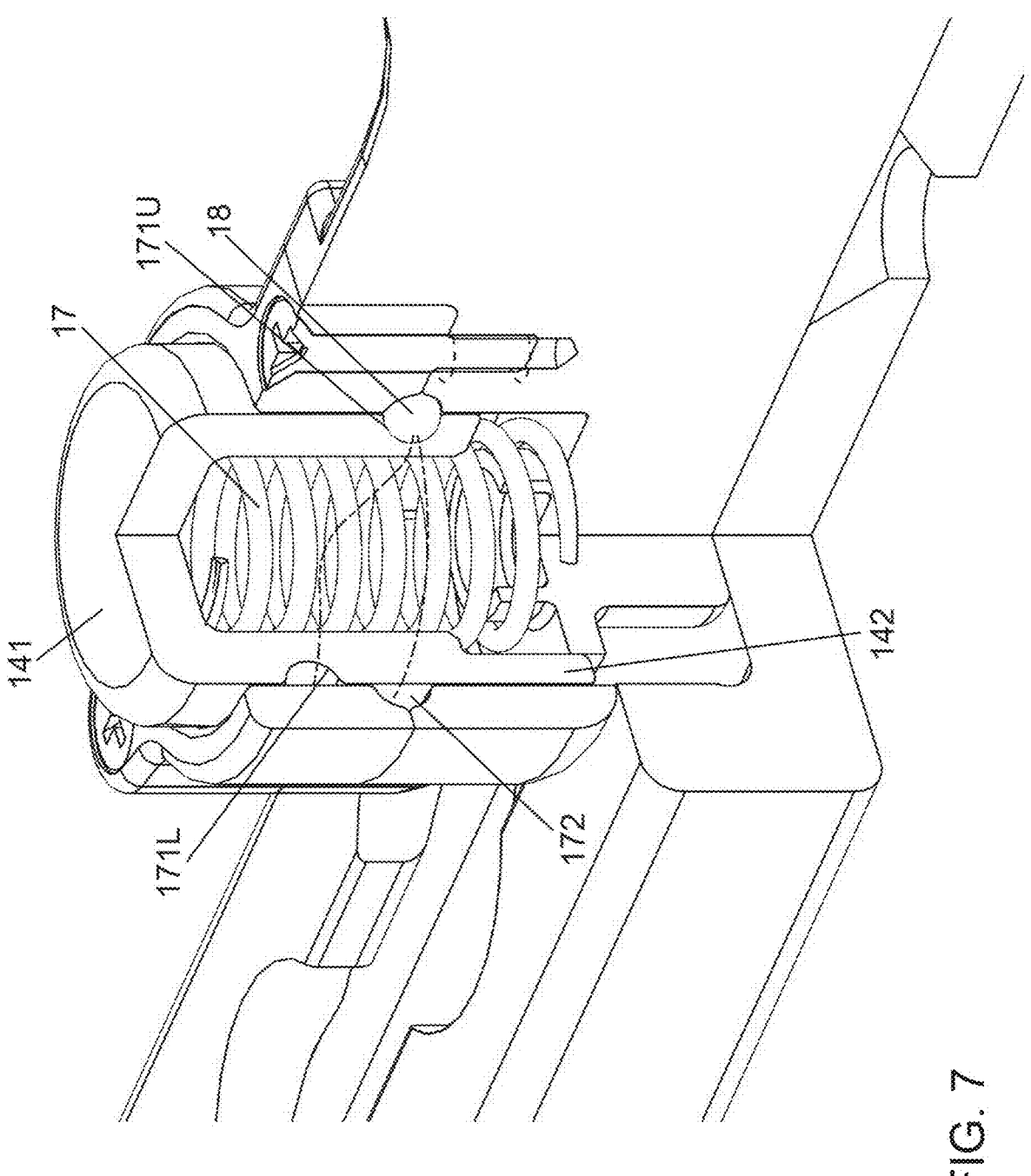
FIG. 7 is a cut-open view of a fitting in the unlocked state, in accordance with one or more embodiments of the present disclosure.

In FIG. 6, the button 14 is pressed against the spring force to the lock position in which the button legs 142 are engaged in the track groove to prevent the fitting 1 moving along the track. The ball 18 is located and contained in a raceway formed by the lower extreme position 171*l* of the groove in the button and the complementary groove 172 in the housing. In the unlocked position, with the spring expanded to its default state, the button extends from the housing, the legs 142 of the button are withdrawn into the housing and out of engagement with the track and the ball is now located and contained within a raceway formed by the upper extreme 171*u* of the groove in the button and the groove in the housing, as shown in FIG. 7.

Figure 9:
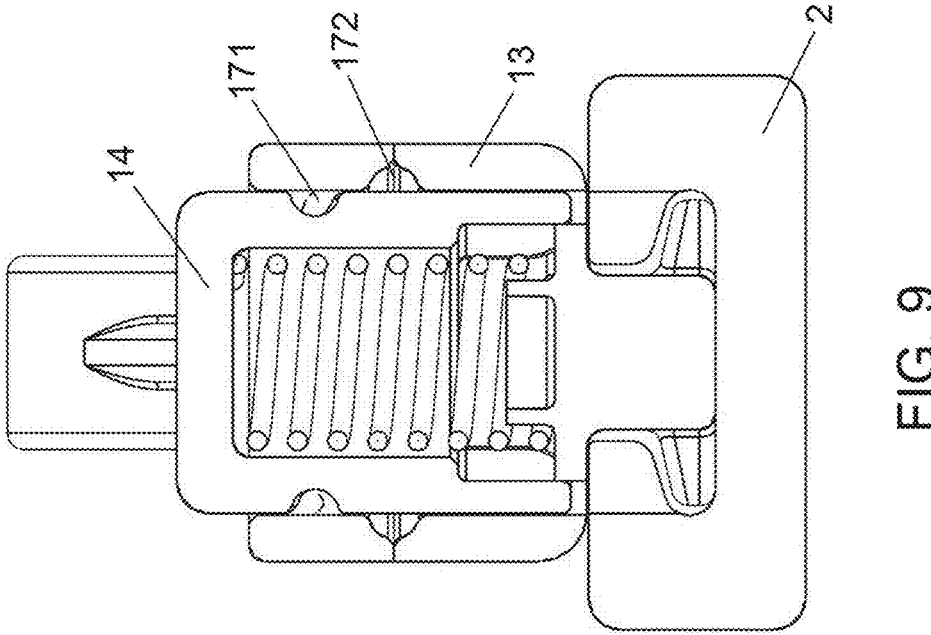
FIG. 9 is a sectional view of a fitting in the unlocked state, in accordance with one or more embodiments of the present disclosure.
Figure 8:
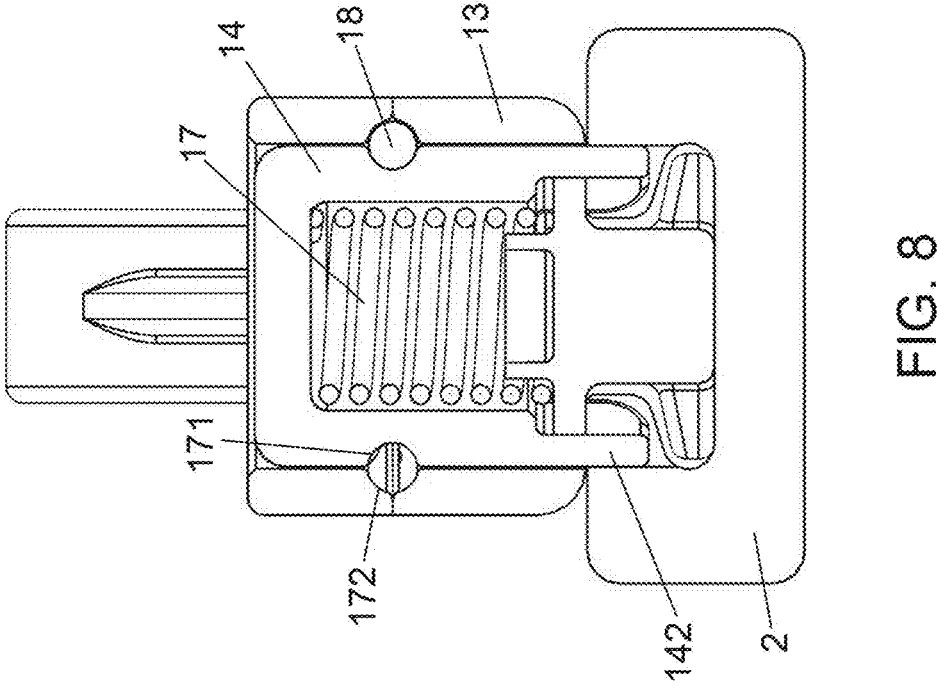
FIG. 8 is a sectional view of a fitting in the locked state, in accordance with one or more embodiments of the present disclosure.

The quick-release mechanism can be further explained with reference to FIGS. 8 and 9. FIG. 8 is a cross-section through the fitting when in the locked position, where the ball is on the raceway defined by the lower position and the housing raceway. When in the unlocked position (as shown in FIG. 9), the lower position of the button raceway and the housing raceway are not aligned. Instead, the ball has jumped to the extreme upper position of the button raceway which is now aligned with the housing raceway. It is contemplated herein that for purposes of the present disclosure 'upper' and 'lower' are used to correspond to the position of the button and not the position of the groove relative to the fitting, however, the opposite terminology could also be used.

Figure 11:
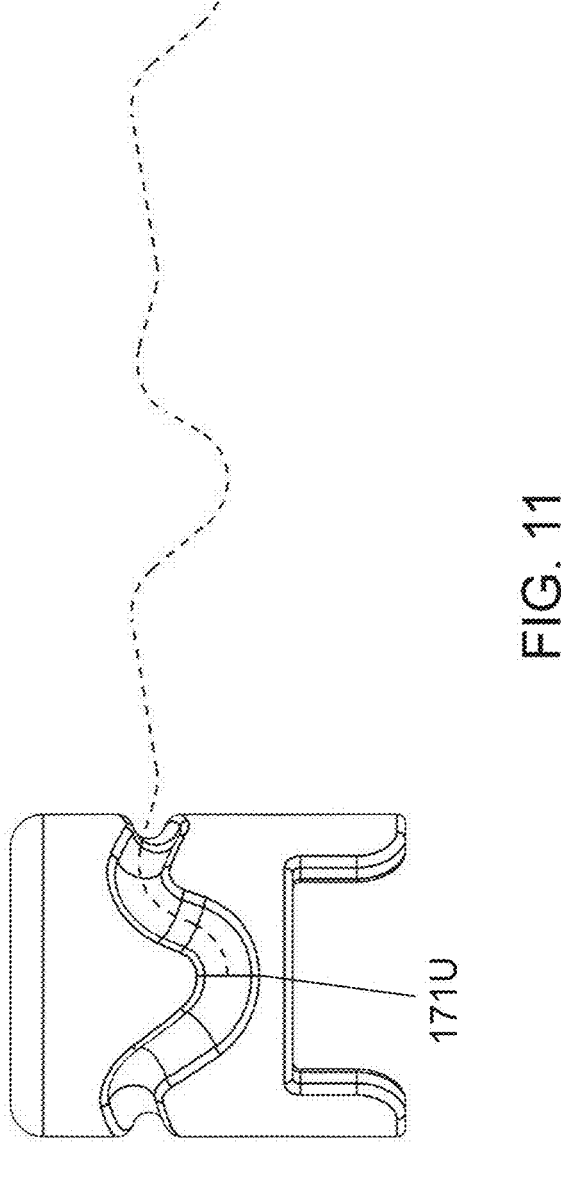
FIG. 11 is a view of a button for use in a fitting, in accordance with one or more embodiments of the present disclosure.
Figure 12:
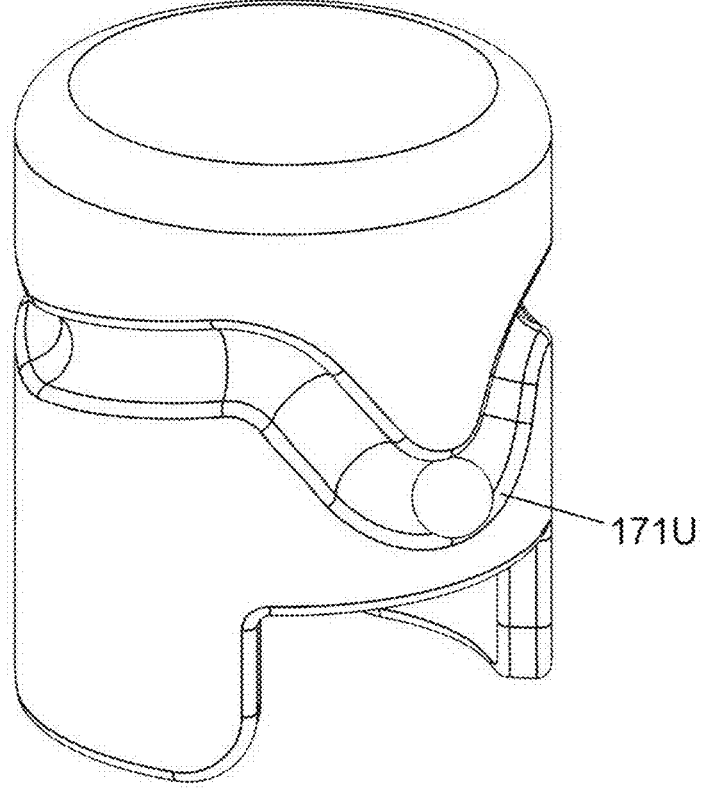
FIG. 12 is an alternative view of a button for use in a fitting, in accordance with one or more embodiments of the present disclosure.

The profile of the groove 171 in the button is also illustrated in FIGS. 11 and 12. In an example, the shape of the groove in its 2D profile, i.e., in the body of the button, is non-symmetrical to prevent the ball from jamming in any position along the groove.

FIG. 12 shows the ball 18 in the extreme upper position 171*u* of the groove 171 in the button 14 when the fitting is unlocked. Although the extreme lower position is not shown, it is contemplated herein that the extreme lower position would be diametrically opposite the extreme upper position and closer to the top surface of the button.

As the button is depressed, the ball 18 rotates around the raceway groove, around the button, to locate at the respective extreme position and to lock with the complementary raceway in the housing. The button itself does not rotate.

Figure 13:
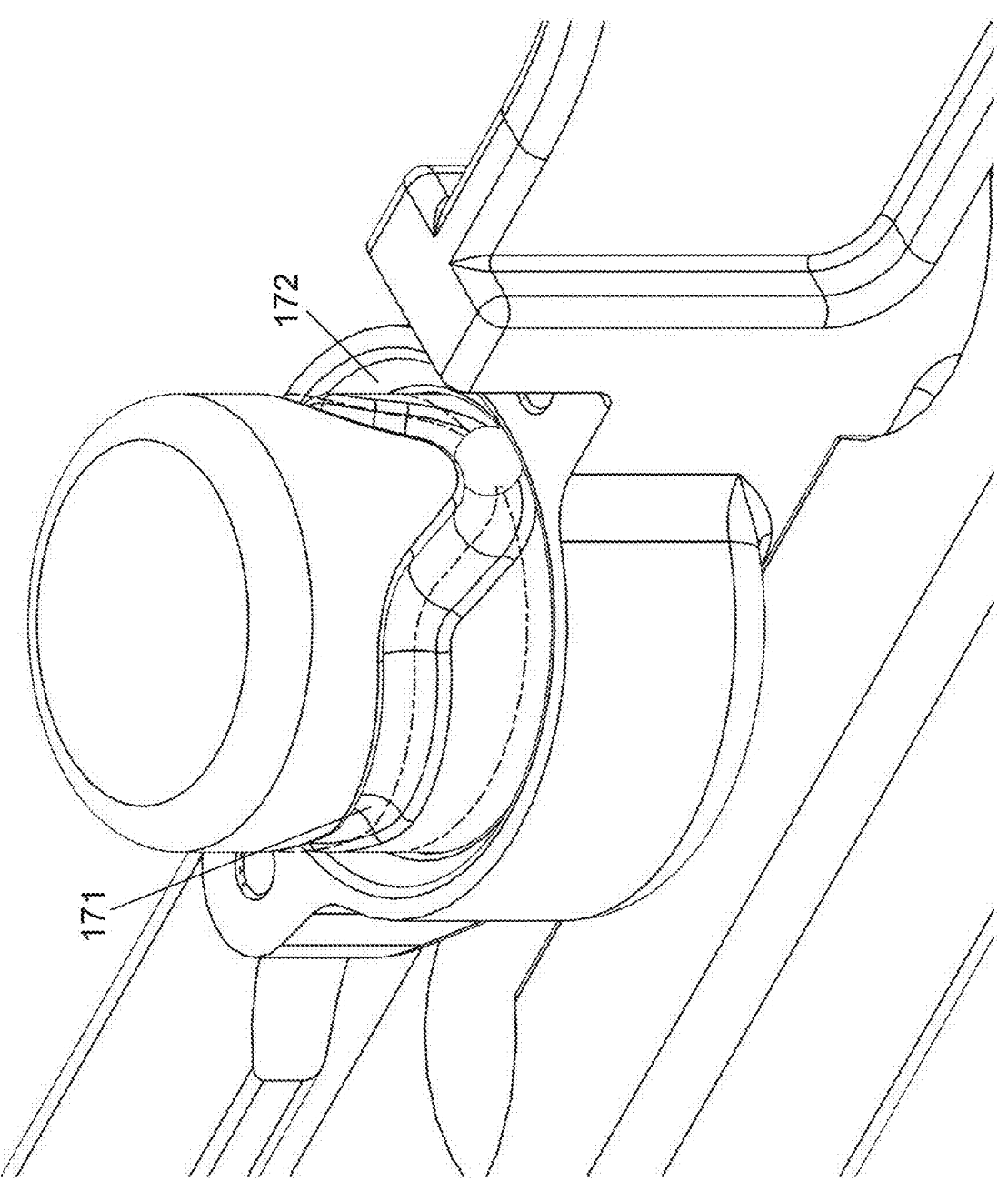
FIG. 13 is a view of the button of FIG. 12 mounted to a track, in accordance with one or more embodiments of the present disclosure.

FIG. 13 shows the complementary grooves 171 and 172 in the button 14 and the housing 13. In FIG. 13, the ball is located at the upper extreme position as the button is not depressed (not locked). As the button is pressed, the ball 18 will be forced out of the upper extreme position and will travel around the groove in the button until it locates and locks in the lower extreme position in engagement with the housing groove, thus locking the fitting to the track via the button legs. If the button is further depressed, the ball is again forced out of the lower position and moves to the upper position allowing the button to return to its unlocked (upper) position under the force of the spring. The non-symmetrical inner profile of the groove in the button means that the ball will not jam.

Figure 15:
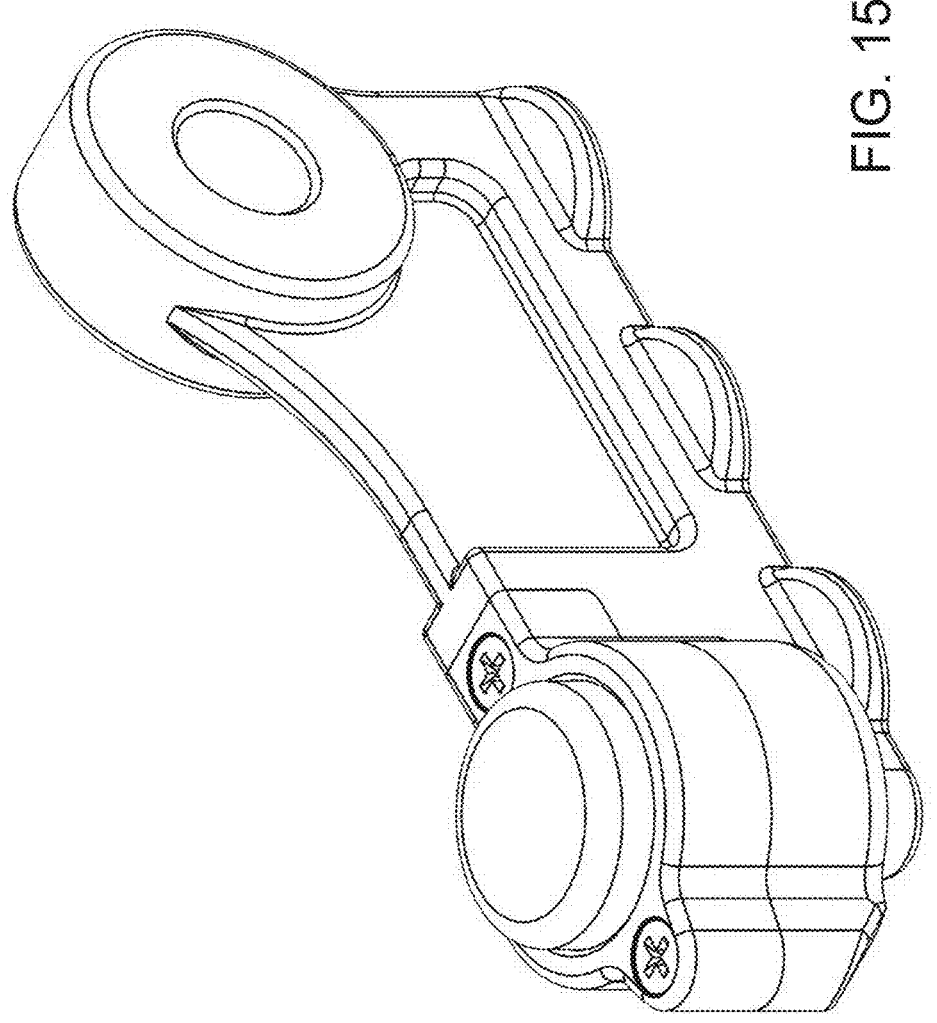
FIG. 15 is an isometric transparent view of a fitting, in accordance with one or more embodiments of the present disclosure.

FIG. 15 is an isometric transparent view depicting the fitting described above as an example of a fitting according to this disclosure.

Figure 14:
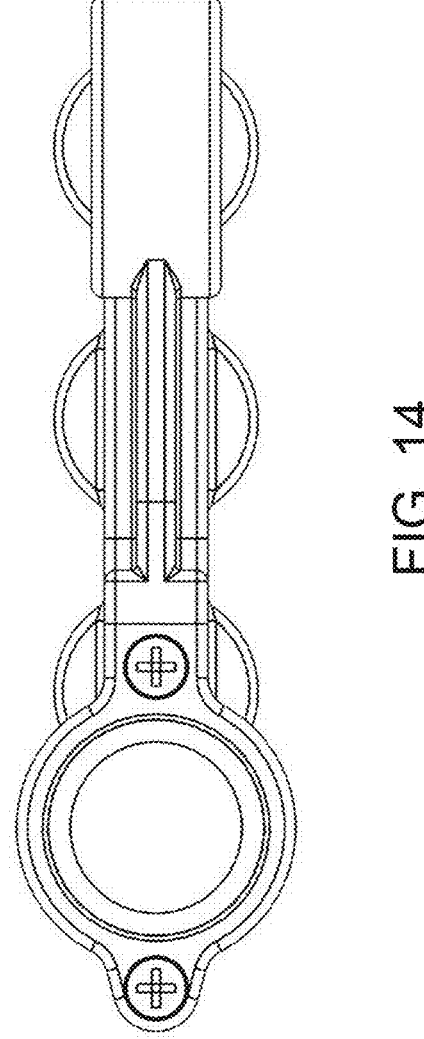
FIG. 14 is a top view of the arrangement of FIG. 13, in accordance with one or more embodiments of the present disclosure.

The fitting can, as seen, for example, in FIG. 14, have a simple, compact and lightweight design but its rigid body allows easy adaptation to the design of the seat.

The compact quick-release mechanism allows the seat to be repositioned along the rail quickly and easily without the use of tools.

Figure 16:
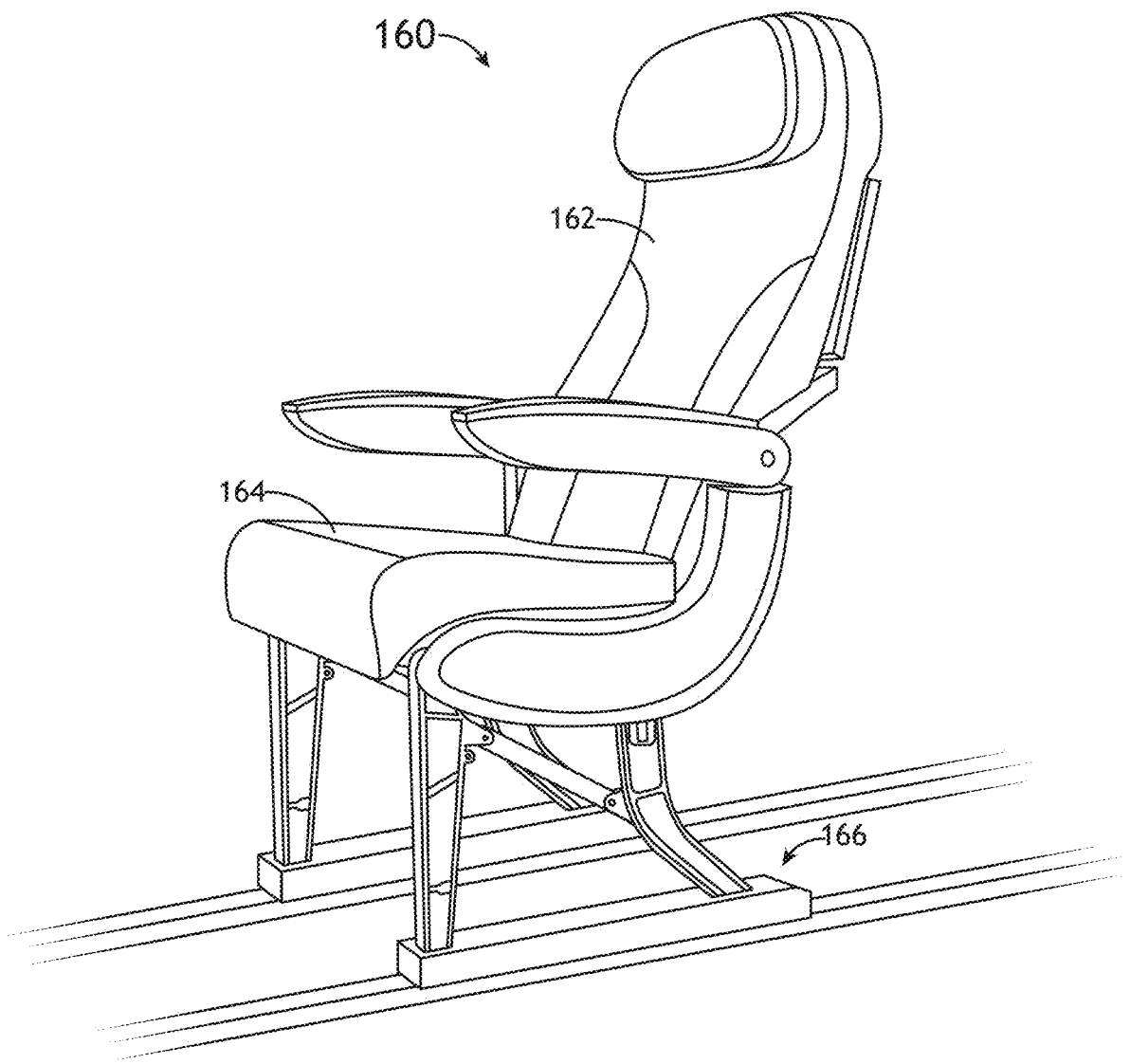
FIG. 16 is a conceptual view of an aircraft seat including the mounting fitting, in accordance with one or more embodiments of the present disclosure.

FIG. 16 is a conceptual view of an aircraft seat 160 including the mounting fitting, in accordance with one or more embodiments of the present disclosure. The mounting fitting 1 may be configured to mount the aircraft seat 160 to a floor or platform of an aircraft cabin via the tracks 2. The aircraft seat 160 may include, but is not limited to, a seatback, a seat pan, a leg assembly, and the like.

The invention claimed is:

1. A mounting fitting for mounting an object to a surface and releasably locking the object in one or more positions relative to the surface, the mounting fitting comprising:

an elongate fitting body, wherein the elongate fitting body comprises:

a first portion configured to be attached to the object, in use; and a second portion having a locking mechanism configured to releasably lock the mounting fitting relative to the surface, in use, wherein the locking mechanism comprises:

a housing within which is mounted a push-button on a spring, the spring biasing the push-button relative to the housing to extend from an opening in the housing, in an unlocked position, the push-button having one or more legs extending into the housing, the one or more legs configured to extend from the housing, in a locking position, when the push-button is pressed against a force of the spring for engagement, in use, with the surface so as to prevent movement of the mounting fitting relative to the surface, the mounting fitting further comprising:

a quick-release mechanism arranged between the push-button and the housing, wherein the quick-release mechanism is configured to lock the push-button in the locking position and to release the push-button from the locking position by a further application of force to the push-button when the push-button is in the locking position, wherein the quick-release mechanism comprises a ball arranged to travel around a groove in the push-button and a complementary groove in the housing.

2. The mounting fitting of claim 1, wherein the groove in the push-button has an upper extreme and a lower extreme, wherein the ball is located between the upper extreme of the groove in the push-button and the complementary groove in the housing when in the unlocked position and between the lower extreme of the groove in the push-button and the complementary groove in the housing when in the locking position.

3. The mounting fitting of claim 2, wherein the ball is caused to move from the lower extreme to the upper extreme in response to the further application of force to the push-button when in the locking position.

4. The mounting fitting of claim 1, wherein the groove in the push-button has a non-symmetrical inner profile.

5. The mounting fitting of claim 1, wherein the first portion comprises:

a hole through the first portion to couple the first portion to the object, in use.

6. The mounting fitting of claim 1, wherein the second portion comprises:

a lower edge of the elongate fitting body to couple the second portion to the surface, in use.

7. The mounting fitting of claim 1, wherein the one or more legs have a curved or arcuate profile.

8. The mounting fitting of claim 1, wherein the locking mechanism is configured to lock in two or more distinct positions on the surface.

9. The mounting fitting of claim 1, wherein the first portion is configured to be attached to a vehicle seat and the locking mechanism is configured to releasably lock to a track on a floor or platform.

10. The mounting fitting of claim 9, wherein the one or more legs are configured to be fitted into a curved recess of the track.

11. A vehicle seat system for a vehicle comprising:

a seat;

a floor track arranged on a floor or platform of the vehicle; and a mounting fitting for mounting an object to a surface and releasably locking the object in one or more positions relative to the surface, the mounting fitting comprising:

an elongate fitting body, wherein the elongate fitting body comprises:

a first portion configured to be attached to the object, in use; and a second portion having a locking mechanism configured to releasably lock the mounting fitting relative to the surface, in use, wherein the locking mechanism comprises:

a housing within which is mounted a push-button on a spring, the spring biasing the push-button relative to the housing to extend from an opening in the housing, in an unlocked position, the push-button having one or more legs extending into the housing, the one or more legs configured to extend from the housing, in a locking position, when the push-button is pressed against a force of the spring for engagement, in use, with the surface so as to prevent movement of the mounting fitting relative to the surface, the mounting fitting further comprising:

a quick-release mechanism arranged between the push-button and the housing, wherein the quick-release mechanism is configured to lock the push-button in the locking position and to release the push-button from the locking position by a further application of force to the push-button when push-button is in the locking position, wherein the first portion is attached to the seat and the second portion is attached to the floor track, wherein a position of the seat relative to the floor track is configured to be releasably locked by the locking mechanism, wherein the quick-release mechanism comprises a ball arranged to travel around a groove in the push-button and a complementary groove in the housing.

12. The vehicle seat system of claim 11, wherein the seat includes an aircraft seat.

*    *    *    *    *